United States Patent
Ruckel et al.

(10) Patent No.: US 6,900,274 B2
(45) Date of Patent: May 31, 2005

(54) TERPENE RESIN-AND HYDROCARBON RESIN-BASED SURFACTANTS AND AQUEOUS DISPERSION OF TACKIFIER RESINS

(75) Inventors: Erwin R. Ruckel, Wilton, CT (US); Kerry L. Thompson, Savannah, GA (US); George L. Gergely, Jr., Richmond Hill, GA (US)

(73) Assignee: Arizona Chemical Company, Jacksonville, FL (US)

( * ) Notice: Subject to any disclaimer, the term of this patent is extended or adjusted under 35 U.S.C. 154(b) by 0 days.

(21) Appl. No.: 10/360,585

(22) Filed: Feb. 6, 2003

(65) Prior Publication Data

US 2004/0158003 A1 Aug. 12, 2004

(51) Int. Cl.$^7$ ............................. C08F 8/46; C08F 32/00; C09J 145/00
(52) U.S. Cl. .................. 525/333.3; 524/270; 524/499; 525/210; 525/211; 525/327.4; 525/327.9; 428/355 R
(58) Field of Search ................................ 524/270, 499; 525/210–211, 285, 327.4, 327.9, 333.3; 428/355 R

(56) References Cited

U.S. PATENT DOCUMENTS

| | | | |
|---|---|---|---|
| 2,993,880 A | | 7/1961 | Aldridge et al. |
| 3,965,059 A | * | 6/1976 | Kerridge et al. ............ 525/416 |
| 4,382,128 A | | 5/1983 | Li |
| 4,477,613 A | | 10/1984 | Evans et al. .................. 524/77 |
| 4,670,504 A | | 6/1987 | Cardenas et al. ............ 524/504 |
| 4,857,563 A | * | 8/1989 | Croft et al. .................. 523/173 |
| 5,268,399 A | | 12/1993 | Wouters et al. ............. 523/336 |
| 5,552,519 A | | 9/1996 | Hemmings et al. ......... 530/216 |
| 5,674,823 A | * | 10/1997 | Ricca et al. ................. 510/102 |
| 6,274,657 B1 | | 8/2001 | Geoghegan et al. ........ 524/270 |
| 6,369,146 B1 | | 4/2002 | Lassila et al. ............... 524/310 |
| 6,461,728 B2 | | 10/2002 | Weiss et al. ................. 428/345 |

FOREIGN PATENT DOCUMENTS

| | | |
|---|---|---|
| EP | 0 088 510 A2 | 9/1983 |
| FR | 961575 | 5/1950 |
| GB | 2273294 A | 6/1994 |
| GB | 2288179 A | 10/1995 |
| JP | 2002-11337 A | 1/2002 |
| WO | WO 00/30591 | 6/2000 |

OTHER PUBLICATIONS

*Esp@cenet* Database abstract for JP 2002–11337. Available from ep.espacenet.com.

* cited by examiner

*Primary Examiner*—Peter Szekely
(74) *Attorney, Agent, or Firm*—Thomas W. Barnes, III

(57) ABSTRACT

A process for preparing a surfactant, useful for dispersing tackifier resins in aqueous media, comprises reacting an αβ-unsaturated carboxylic acid or anhydride, or an ester thereof, with a terpene- or hydrocarbon-based resin to form an adduct, then reacting the adduct with a polyalkylene polyol to yield the surfactant. In a related embodiment, the surfactant is subsequently functionalized. Also disclosed are surfactants prepared using a disclosed process; compositions comprising a disclosed surfactant and a tackifier resin; aqueous dispersions comprising a disclosed surfactant; tackifier resin and water; adhesive compositions comprising a disclosed aqueous dispersion and a polymer latex; and pressure sensitive adhesive overlays prepared using a disclosed adhesive composition.

58 Claims, No Drawings

TERPENE RESIN-AND HYDROCARBON RESIN-BASED SURFACTANTS AND AQUEOUS DISPERSION OF TACKIFIER RESINS

BACKGROUND OF THE INVENTION

1. Field of the Invention

The present invention generally pertains to surfactants, more specifically, to surfactants useful for preparing aqueous dispersions of tackifier resins, where the resins may be blended with latex to provide waterborne adhesives.

2. Description of the Related Art

The ongoing development of improved waterborne (i.e., water-dispersed) adhesives to replace solvent based adhesives has largely been motivated by government regulation of solvents, stemming from the perceived health and environmental hazards thereof. As a result, waterborne adhesives have become extensively used to adhere various substrates together. Such adhesives often comprise both a high molecular weight elastomeric latex (or mixture of latexes, such as acrylic and styrene-butadiene rubber latex), and at least one water-dispersed tackifier resin. It is possible to prepare a functional waterborne adhesive without a tackifier resin. However, inclusion of the latter is generally required to economically produce an adhesive exhibiting an adhesion to various substrates that allows for commercial applicability of the adhesive.

A significant portion of commercial waterborne adhesives are pressure sensitive adhesives ("PSAs"). The latter are used, for example, for adhesive tapes; to adhere labels to the cellulosic, polyolefinic and polar-polymeric substrates of bottles and other packaging containers; and to adhere cabinet and wall decorations and the like.

While PSAs generally exhibit good adhesion to a variety of substrates, their adhesive performance is limited. For example, the adhesion of PSAs to substrates is generally inferior to that of their solvent-based counterparts. This deficiency may be attributed, at least in part, to the surfactant used to disperse the tackifier resin or prepare the latex or blend of latexes used for the PSA. Surfactants inherently plasticize polymer-tackifier resin blends, which reduces adhesive shear. Also, surfactants often impede adhesion by migrating to the substrate interface, thereby interfering with the ability of the adhesive to stick thereto.

Waterborne PSAs are also characterized by a limited shelf life, by a limited ability to wet adhesive substrates (i.e., the substrates used to make adhesive tapes, labels, and the like), and by a mechanical stability that is less than ideal for high-shear and high-speed applications. Extended shelf life is generally desirable. Exceptional adhesive substrate wetting and superior mechanical stability are important for high-speed coating of an adhesive substrate by an adhesive. High-speed coaters, such as gravure, reverse gravure and slot die coaters, are now commonly used to produce lower coat weights and allow for increased throughputs.

Again, the surfactant used in preparing the tackifier resin dispersion is a limiting factor. Use of nonylphenol-based surfactants has yielded tackifier resin dispersions and, therefrom, PSAs that exhibit substrate wetting and mechanical stability that is compatible with the above-mentioned high-speed coating methods. However, governmental regulatory activity has been increasingly directed to nonylphenols and their derivatives to reduce or eliminate their presence in the marketplace, as well as in chemical plant aqueous effluents.

Methods for the self-emulsification of resins have been described. See, e.g., U.S. Pat. Nos. 4,670,504 and 5,268,399, and Great Britain Patent Nos. 2,273,294 and 2,288,179. In these methods, a resin is treated so that hydrophilic groups are added to a small portion of the bulk resin. That is, a small amount of hydrophilic groups are added to a resin, so that hydrophilic groups are introduced to a small fraction of the bulk resin molecules. The resin molecules containing these hydrophilic groups then act as a surfactant when water, and optionally some co-solvent, are added to the resin/modified resin mixture.

Accordingly, there remains a need in the art for surfactants that are useful for preparing tackifiers that, when blended with latex, yield waterborne adhesives, in particular, PSAs, having improved adhesion, improved adhesive substrate wettability, greater mechanical strength for high-speed coating operations, and an improved shelf-life. The present invention fulfills these needs and provides further related advantages as described herein.

BRIEF SUMMARY OF THE INVENTION

In brief, the present invention is directed to processes for preparing a surfactant having utility for dispersing resins, particularly tackifier resins, in water, where the dispersed tackifier resin is then used for preparing waterborne adhesives. The present invention is also directed to surfactants prepared using the disclosed processes, as well as to compositions, for example, aqueous dispersions and adhesive compositions comprising a disclosed surfactant.

In one aspect, the present invention is directed to a process for preparing a surfactant. The process includes selecting a resin, where the resin comprises the polymerization residues of monomers, and the monomers are, or include, unsaturated hydrocarbons. The selected resin is reacted with an α,β-unsaturated carboxylic acid, or anhydride or ester thereof, to provide a carbonyl-containing resin, also referred to herein as an adduct. The adduct is then reacted with a reactive poly(alkylene oxide) to provide a surfactant of the present invention. This surfactant may be chemically modified by phosphorylation or sulfation.

In one representative embodiment, the present invention is directed to a process for preparing a surfactant comprising: (1) reacting an α,β-unsaturated carboxylic acid or anhydride, or an ester thereof, with a resin selected from the group consisting of a polyterpene resin, a terpene-phenol resin, a terpene-hydrocarbon resin, a hydrocarbon resin, or a vinylaromatic-modified hydrocarbon resin, to provide an adduct; and (2) reacting the adduct with a hydroxy-terminated poly(alkylene oxide) to provide the surfactant. In one related embodiment, the apunsaturated acid is maleic acid, and the corresponding anhydride is maleic anhydride ("MA"). In another related embodiment, the poly(alkylene oxide) is polyethylene glycol.

The present invention, in another representative embodiment, is directed to a process for preparing a surfactant that comprises the two steps of the above-described representative embodiment, and further comprises modifying the surfactant provided thereby by means of phosphorylation or sulfation to provide a functionalized surfactant.

Further representative embodiments of the present invention are directed to the surfactants prepared using the above-described processes; to compositions comprising a disclosed surfactant and a tackifier resin; to aqueous dispersions comprising a disclosed surfactant, a tackifier resin and water; and to adhesive compositions comprising a disclosed surfactant, a tackifier resin, a polymer latex and water. A related embodiment is directed to a pressure sensitive adhesive article prepared from a disclosed adhesive composition.

These and other aspects of the invention will be evident upon reference to the following description of the invention.

DETAILED DESCRIPTION OF THE INVENTION

In one aspect, the present invention is directed to a process for preparing a surfactant. The process includes selecting a resin, where the resin comprises the polymerization residues of monomers, and the monomers are, or include, unsaturated hydrocarbons. The selected resin is reacted with an α,β-unsaturated carboxylic acid, or anhydride or ester thereof, to provide a carbonyl-containing resin, also referred to herein as an adduct. The adduct is then reacted with a carboxyl-reactive poly(alkylene oxide), e.g., a hydroxyl- or amine-terminated poly(alkylene oxide), or with an alkylene oxide so as to generate the poly(alkylene oxide) in situ, so as to provide a surfactant of the present invention. Depending on its structure, the surfactant may be chemically modified by phosphorylation or sulfation.

The resin utilized in the process of the present invention is prepared in whole or part from hydrocarbon monomers. In one exemplary embodiment the hydrocarbon is a terpene, and the resulting resin may be, e.g., a polyterpene resin (i.e., a resin prepared from terpene as the sole hydrocarbon monomer), a terpene hydrocarbon resin (i.e., a resin prepared from terpene as well as non-terpene hydrocarbon monomer(s)), and a terpene phenolic resin (i.e., a resin prepared from terpene and phenolic compound), where collectively these resins are referred to herein as "terpene resins". In one embodiment, the resin is a terpene hydrocarbon resin, e.g., a terpene vinylaromatic resin. In another embodiment the resin is a terpene phenolic resin. In yet another embodiment the resin is a polyterpene resin.

Terpene resins that may be used in the process of the present invention include any resins prepared, in whole or part, from an unsaturated terpene C10 hydrocarbon (i.e., a terpene containing ten carbons), where exemplary terpenes include, without limitation, δ-2-carene, δ-3-carene, dipentene, limonene, myrcene, β-phellandrene, α-pinene, β-pinene, α-terpinene, γ-terpinene, and terpinolene.

In one aspect, the selected terpene resin is prepared, at least in part, from α-pinene. In another aspect the selected terpene resin is prepared, at least in part, from β-pinene. In another aspect, the selected terpene resin is prepared, at least in part, from limonene. In another aspect, the selected terpene resin is prepared, at least in part, from a carene. Each of these terpenes may be obtained from various commercial suppliers, e.g., Aldrich Chemical (Milwaukee, Wis.), Arizona Chemical Company (Jacksonville, Fla.), Millennium Specialty (Jacksonville, Fla.), International Flavors and Fragrances (formerly Bush Boake Allen in Jacksonville, Fla.), or DRT (Les Derives Resiniques et Terpeniques of Dax, France) or by transformations such as the isomerization of α-pinene to dipentene or of δ-3-carene to δ-2-carene or the pyrolysis of β-pinene to myrcene. α-Pinene, β-pinene, δ-3-carene and dipentene are often ultimately obtained from trees, particularly pine trees. Limonene can be obtained from the citrus processing industry.

In one aspect, the resin is the cationic polymerization product of a terpene, e.g., it may be prepared by cationic polymerization of resin-grade β-pinene monomer, limonene monomer, or a mixture of the two monomers. Cationic polymerization of terpenes may be achieved by treating the terpene with a Lewis acid catalyst. More specifically, catalysts that may be used include aluminum chloride ($AlCl_3$) and boron trifluoride ($BF_3$) and their derivatives (e.g., their etherates or other solvated form); as well as acidic clays, antimony halides, strong protic acids such as hydrofluoric acid and sulfuric acid, and titanium tetrachloride. The catalysts may be removed from the resin by any number of processes known to those skilled in the art. The terpene resins, so produced, may be further subjected to treatment at elevated temperature to distill away solvent and remove co-products, and thereby achieve a desired softening point for the resin.

A preferred terpene from which to prepare a terpene resin is β-pinene. β-pinene monomer is commonly obtained by distillation of crude sulfate turpentine, which is a by-product of the paper industry. Resin-grade β-pinene is generally about 80% by weight β-pinene with much of the remainder being α-pinene. Higher purity grades of β-pinene, such as the so-called aroma-chemical grade thereof, which is greater than 90% by weight β-pinene, may also be used in preparing the terpene resins. See, e.g., U.S. Pat. No. 4,487,901 for disclosure directed to making β-pinene resin. The resin may also be prepared from α-pinene (see, e.g., U.S. Pat. Nos. 4,113,653 and 4.057,682).

Other preferred terpenes are limonene and dipentene. Limonene may be obtained as a byproduct of the citrus industry. Dipentene obtained by pyrolysis or catalytic cracking of α-pinene (i.e., racemic limonene) may also be used in preparing the terpene resins.

The terpene resin may comprise, in addition to the residues from the above terpenes, the residues of various non-terpenic unsaturated compounds, particularly unsaturated hydrocarbons, e.g., olefins and dienes. Examples thereof include, but are not limited to: isobutylene, diisobutylene, 1-alkenes (e.g., 1-octadecene), 2-alkenes, trisubstituted alkenes, vinylcyclohexene, as well as piperylene and dicyclopentadiene streams obtained from steam cracking of petroleum distillates. The latter streams generally include piperylene, isoprene, 2-methyl-2-butene, 2-methyl-1-butene, cyclopentene, an acyclic pentene, cyclopentadiene, and dicyclopentadiene. See, e.g., U.S. Pat. Nos. 6,121,392 and 3,959,238 for disclosure directed to resins made from β-pinene and various unsaturated hydrocarbons.

An exemplary terpene-hydrocarbon resin contains from 65 to 35 percent by weight of polymeric units derived from dicyclopentadiene and from 35 to 65 percent by weight of polymeric units derived from ,βpinene. In one aspect, the molar ratio of the dicyclopentadiene to beta-pinene in the polymerization reaction starting materials ranges from about 1:2 to about 2:1. The polymerization reaction between dicyclopentadiene and β-pinene may be a thermal (i.e., no catalyst is employed) or catalyzed (i.e., conducted in the presence of a catalyst, e.g., an acid catalyst). Examples of acid catalysts that may be used include Bronsted acid and Lewis acid-type catalysts, such as $H_2SO_4$, HCl, $H_3PO_4$; metal halides such as $BF_3$, $BCl_3$, $AlCl_3$, $AlBr_3$, $SnCl_4$, $ZnCl_2$, $SbCl_3$ as well as the etherates thereof. In the catalyzed polymerization process, the amount of catalyst may range from about 0.1 to about 20 weight percent of catalyst based on the total weight of reactants to be polymerized. The polymerization reaction may be carried out neat (without solvent) at or above the melting points of the reactants, or can be carried out in the presence of a solvent. The reaction pressure may vary and range from about one atmosphere to about 100 atmospheres with a pressure of from about two atmospheres to about ten atmospheres being preferred. The reaction temperature may range from about 0–100° C. A reaction time of about 1–8 hours is generally sufficient to achieve a desired molecular weight distribution of from about 550 to about 55,000 (weight average molecular weight), and a softening point ranging from about 100 to about 170° C. Other limonene-containing hydrocarbon resins include those described in U.S. Pat. Nos. 6,357,499 and 6,228,944.

Suitable terpene resins that may be used in the above-disclosed process of the present invention include, but are not limited to, commercially-available terpene resins sold by the Arizona Chemical Company (Jacksonville, Fla.) designated as SYLVARES® terpene resins M-1115, B-115, 7100, 7115, 7125, 1085, 1100, 1115, 1125, and A-25.

Terpene-vinylaromatic resins (also known as aromatic modified terpene resins) that may be used for the above-disclosed process of the present invention, may be prepared by acid catalyzed polymerization, in a suitable solvent, using any of the above-mentioned terpenes with a vinylaromatic monomer. Lewis acid catalysts, including $AlCl_3$ and $BF_3$ or their derivatives, may be used. Acidic clays, antimony halides, strong protic acids such as hydrofluoric and sulfuric acid, and titanium tetrachloride, may also be used. The vinylaromatic monomers that may be used include, but are not limited to: styrene, indene, methylstyrenes, and para-alkylstyrenes, including mixtures thereof. These resins may be post-created with iodine or by way of other decolorizing processes. Some specific examples of terpene-vinylaromatic resins, suitable for use in the above-disclosed process of the present invention, are products designated as SYLVARES® ZT 105LT and 5100 resins, sold by the Arizona Chemical Company (Jacksonville, Fla.).

Terpene-phenol resins that may be used for the above-disclosed process of the present invention ("the terpene-phenol resins") may be prepared by acid catalyzed polymerization, in a suitable solvent, of any of the above-mentioned terpenes with phenol and/or a derivative thereof. This chemistry is well known in the art. See, e.g., U.S. Pat. Nos. 5,723,566 and 5,844,063. Lewis acids, including but not limited to boron trifluoride and derivatives or complexes thereof, and strong protic acids such as those listed above, may be used. The phenolic portion of the terpene phenol resin may be, e.g., phenol itself, or substituted phenols such as, for example, monosubstituted phenol including monoalkylsubstituted phenol, disubstituted phenol including dialkylsubstituted phenol, trisubstituted phenol including trialkylsubstituted phenol, and a naphthalene compound having a hydroxyl substituent attached to the ring.

Non-terpene olefins and dienes that may be used in addition to the terpenes for preparing the terpene-phenol resins, include those listed above for the terpene resins. For instance, residues of the following non-terpene olefins and diolefins may be present in the terpene-phenolic resin: vinylaromatics such as styrene, indene, α-methylstyrene, divinylbenzene, a divinylbenzene with one or more alkyl groups, isobutylene, diisobutylene, a 1-alkene, a 2-alkene, a trisubstituted alkene, vinylcyclohexane, piperylene, isoprene, 2-methyl-2-bytene, 2-methyl-1-bytene, cyclopentene, an acyclic pentene, cyclopentadiene, dicyclopentadiene, and alkylaromatic styrenes.

Some specific examples of terpene-phenol resins, suitable for use in the above-disclosed process of the present invention, are commercial products designated as SYVARES® TP 300, 2040, 2040 HM, 2019, 7042 and 3523 resins, sold by Arizona Chemical Company (Jacksonville, Fla.).

Some hydrocarbon resins useful in the preparation of surfactants of the present invention may have little or no terpene-derived residues. For example, C5 unsaturated hydrocarbons may be used to prepare suitable hydrocarbon resins. Such resins may be prepared by cationic polymerization of piperylene streams, obtained by steam cracking of petroleum distillates. While the composition of these streams is quite variable, they generally include cis- and trans-piperylenes, isoprene, 2-methyl-2-bytene, 2-methyl-1-butene, cyclopentene, acyclic pentanes, cyclopentadiene and dicyclopentadiene.

Olefinic monomers may be co-reacted with the C5 unsaturated hydrocarbons present in such streams. Examples include 1-alkenes such as isobutylene and diisobutylene, vinylaromatic monomers such as styrene, terpenes such as those mentioned above, and mixtures thereof. Also, olefins such as 2-methyl-2-butene may be added to such streams to increase the amount of the corresponding olefin already present therein. Catalysts that may be used include Lewis acids such as $AlCl_3$, $BF_3$ and derivatives thereof.

Another type of the hydrocarbon resin that may be utilized to prepare a surfactant according to the present invention is prepared using thermal polymerization of streams rich in dicyclopentadiene, including its isomers and derivatives. Additionally, these monomers may be thermally co-polymerized with a mixture of vinylaromatic monomers, such as those listed previously, as well as with pure styrene or pure alkyl styrenes, such as those mentioned above. The hydrocarbon resins may be used as prepared, or may be partially or completely hydrogenated. However completely or substantially hydrogenated hydrocarbon resins are not preferred because they can be more difficult to react to form an adduct. In one aspect of the invention, the hydrocarbon resin contains unsaturation, i.e., contains double and/or triple carbon-carbon bonds. In another aspect of the invention the hydrocarbon resin has not undergone a hydrogenation treatment prior to reaction with an α,β-unsaturated carboxylic acid or anhydride or ester.

Some of the processes that may be used to prepare the above-described terpene, terpene-phenol, terpene-vinylaromatic and hydrocarbon resins, are described in the Kirk-Othmer Encyclopedia of Chemical Technology, Fourth Edition, Volume 13, pp. 717–743, John Wiley & Sons, New York, N.Y.

The selected hydrocarbon resin is reacted with an α,β-unsaturated carboxylic acid, or anhydride or ester thereof, to provide a carbonyl-containing resin, also referred to herein as an adduct. As used herein, "α,β-unsaturated carboxylic acid" refers to compounds that have the structure $(R^1)(R^2)C=C(R^3)—C(=O)—OH$ where each of $R^1$, $R^2$ and $R^3$ is selected from hydrogen, halogen and organic groups. Thus, an αβ-unsaturated carboxylic acid has at least one double bond between adjacent carbon atoms, wherein at least one of these carbon atoms is bonded to a carboxyl group. The term "α,β-unsaturated carboxylic anhydride" simply refers to the anhydrides thereof, which may be mixed anhydrides (i.e., formed from two different carboxylic acids) or may be homogeneous anhydrides (i.e., formed from two molecules having the same structure), or may be internal anhydrides (i.e., one molecule has two carboxylic acid groups, and those two groups react together to form an anhydride, e.g., maleic anhydride).

Grafting unsaturated acids and anhydrides onto resins using a thermal condensation process is described in, for example, U.S. Pat. Nos. 3,379,663 and 3,953,407. Free radical grafting has also been disclosed in U.S. Pat. Nos. 3,279,925; 3,005,800; and 3,161,620. Either of these approaches may be utilized to prepare an adduct in the process of the present invention. The grafting reaction may be carried out without solvent at a temperature ranging from 170° C. to 240° C. Alternatively, a solvent may be used. Excess, unreacted acid or anhydride may be removed by, for example, distillation. Reaction time may vary from 2–24 hours.

In one particular embodiment of the process of the present invention, the α,β-unsaturated carboxylic acid is maleic acid, and the α,β-unsaturated carboxylic anhydride is maleic anhydride. Other α,β-unsaturated carboxylic acids and anhydrides thereof that may be used for the adduct-forming reaction include, but are not limited to, fumaric, citraconic and itaconic acids and their respective anhydrides. Furthermore, esters of an α,β-unsaturated carboxylic acids may be used for the adduct-forming reaction. In general, about 1–30 wt % of the α,β-unsaturated carboxylic acid is reacted with the resin, based on the total weight of α,β-unsaturated carboxylic acid and resin. For instance, when maleic anhydride is used for the adduct-forming reaction, about 1–30 parts of maleic anhydride are reacted with 100 parts of resin. In various aspects of the invention, the residue from the α,β-unsaturated carboxylic acid or anhydride or ester thereof constitutes at least 3 wt %, or at least 4 wt %, or at least 5 wt %, or at least 6 wt %, or at least 7 wt % of the weight of the adduct. When the residue from the α,β-unsaturated carboxylic acid or anhydride or ester thereof constitutes less than about 3–4 wt % of the adduct weight, the subsequently-formed surfactant may not have enough hydrophilic character to function as a surfactant. Thus, in various additional aspects, the residue from the α,β-unsaturated carboxylic acid or anhydride or ester thereof that is present in the adduct constitutes 3–30 wt % of the adduct weight, or 3–25 wt %, or 3–20 wt %, or 3–15 wt %, or 3–10 wt %, or 4–25 wt %, or 4–20 wt %, or 4–15 wt %, or 4–10 wt %, or 5–25 wt %, or 5–20 wt %, or 5–15 wt %, or 5–10 wt %, each percent value based on the total weight of adduct. Such weight measurements can be made by measuring the weight of the starting material hydrocarbon resin, and then weighing the product adduct. The difference is attributed to the weight contributed by the residue from the α,β-unsaturated carboxylic acid or anhydride or ester thereof. When this difference is too small, the adduct does not have the desired surfactancy characteristics.

In a preferred embodiment, a terpene resin is reacted with maleic anhydride to provide an adduct, and this adduct is reacted so as to incorporate poly(alkylene oxide) groups. For instance, the adduct may be reacted with alkylene oxide, e.g., ethylene oxide, and thereby form poly(alkylene oxide) directly on the adduct. Alternatively, the poly(alkylene oxide) may be formed separately, and then reacted with the adduct. Methods for reacting alkylene oxide with a carboxylic acid group so as to convert the acid into the corresponding poly(alkylene oxide) ester, and methods for reacting poly(alkylene oxide) with a carboxylic acid group, are both well known in the art.

For example, in one aspect the invention, the adduct may be subsequently reacted with a reactive polyalkylene polyol or an alkylene oxide (collectively, PAO) to provide the surfactant. When the adduct is prepared using an α,β-unsaturated carboxylic acid or anhydride thereof, then the reaction with hydroxyl-terminated PAO is an esterification reaction. When an ester of the α,βunsaturated carboxylic acid or anhydride is used to prepare the adduct, then reaction with hydroxyl-terminated PAO is a transesterification reaction.

As used herein, PAO refers to an essentially linear polymer ("chain polymer") having a molecular weight ranging from 1,000–20,000 that contains repetitive alkylene ether groups. An alkylene ether group is represented by —R—O— where "R" represents a $C_1$–$C_6$ alkylene group and "O" represents oxygen, where the PAO has repetitive —R—O— groups, denoted (—R—O—)$_n$, where R is independently selected at each occurrence. A preferred alkylene group is a $C_2$ alkylene group, i.e., an ethylene group. The PAO has at least one carboxyl-reactive group, e.g., a hydroxyl or amino group. In one aspect, the PAO has two carboxyl-reactive groups, where in a preferred embodiment both of these carboxyl-reactive groups are hydroxyl groups. Two or more different PAOs may be reacted with the adduct, where these PAOs may differ in various ways, e.g., compositionally in that one PAO may contain more ethylene oxide residues than another PAO, or by molecular weight in that one PAO may have a larger average (either number average or weight average) molecular weight than another PAO.

In one specific embodiment, the PAO is polyethylene glycol (hereinafter, "PEG"). In a related embodiment, the molecular weight of the PEG ranges from 1,000 to 20,000. The molecular weight of the PEG, in another related embodiment, ranges from 2,000 to 8,000. In a preferred embodiment, the PAO has two hydroxyl groups, one of which reacts with the adduct, and the other of which is available for further functional group modification as discussed below.

The amount of PAO reacted with the adduct may range from about 0.8 to 1.8 equivalents of hydroxyl per equivalent of carboxyl group present in the adduct. The temperature at which the adduct is reacted with the PAO may range from about 240° C. to 290° C. A more narrow temperature range of from 240° C. to 265° C. may be used instead. In one embodiment, the reaction between the adduct and PAO is carried out until an acid number of 25 or less is reached, while in another embodiment the reaction is carried out until an acid number of less than 5 is reached. Thus, in one aspect, the surfactant has an acid number of less than 25, while in another aspect the surfactant has an acid number of less than 5. In another aspect surfactant has an acid number within the range of 5 and 25.

Furthermore, while not required, a catalyst may be used for the above esterification reaction between the PAO and the resin adduct. Catalysts that may be used include, but are not limited to, acids such as phosphoric, hypophosphorus and sulfuric acids; alkylsulfonic and arylsulfonic acids; and oxides, hydroxides and carboxylates of Group I and Group II elements (alkaline and alkaline earth).

The present invention, in another representative embodiment, is directed to a process for preparing a surfactant that comprises forming an adduct and reacting that adduct with PAO, as described above, and then modifying the surfactant by means of phosphorylation or sulfation to provide a functionalized surfactant. In a preferred embodiment, the reaction between the adduct and the PAO provides a surfactant molecule that has a plurality of polyalkylene polyol chains, such as PEG chains, grafted to the adduct backbone. Many of the plurality of chains terminate with a hydroxyl group. Thus, at the sites of the hydroxyl groups, the chains may be functionalized to yield surfactants having different properties, depending upon the pendent functionality imparted thereto.

Imparting pendent functionality to the surfactant by sulfation may be accomplished using sulfur trioxide ($SO_3$), oleum, or acetyl sulfate. The formation of sulfonates is also possible when there are double bonds present in the surfactant adduct backbone or polyalkylene polyol chains pendent therefrom. Imparting pendent functionality to the surfactant by phosphorylation of the hydroxyl-terminated chains may be accomplished using reactants that include, but are not limited to, phosphorus pentoxide ($P_2O_5$), phosphorus trichloride ($PCl_3$), polyphosphoric acid, and phosphorus oxychloride ($POCl_3$).

Thus, in various aspects, the present invention is directed to a surfactant prepared by reacting a resin with an $\alpha,\beta$-unsaturated carboxylic acid or ester or anhydride to thereby form an adduct; optionally reacting the adduct with a poly(alkyleneoxide) (PAO) to provide a surfactant; and optionally treating the surfactant under sulfation or phosphorylation conditions to provide a modified surfactant.

In one aspect of the invention, the surfactant is isolated prior to being used as a surfactant, i.e., it is isolated and/or purified prior to being combined with water. Thus, the invention provides, in one aspect, surfactant that is anhydrous at room temperature and pressure. This isolated surfactant can then be added to other compositions, e.g., tackifier resins, to provide an aqueous dispersion of the tackifier. Thus, in one aspect, the adduct is provided in isolated form, while in another aspect the surfactant is provided in isolated form, each at room temperature and pressure. In one aspect, "isolated form" means free from water.

The present invention, in yet further aspects, is directed to compositions comprising a surfactant as described herein and a tackifier resin, and to aqueous dispersions comprising these two components. As used herein, "tackifier resin" refers to a resin that enhances the adhesive properties of an adhesive formulation. Such adhesive properties include, without limitation, tackiness, peel-resistance and ease of surface wetting. Suitable tackifier resins include the terpene, terpene-hydrocarbon, terpene-phenol, and hydrocarbon resins described previously. Another suitable tackifier resin is a rosin ester tackifier resin.

Compositions of the present invention, comprising a disclosed surfactant and a tackifier resin, may be prepared by melting the tackifier resin, then adding the surfactant and mixing it with the resin by stirring. Aqueous dispersions of surfactant/tackifier resin may be prepared by adding hot water to the melted tackifier resin having the surfactant mixed therewith. The hot water may be added to first form a water-in-oil emulsion. More water is then added to bring about an inversion to an oil-in-water emulsion and, then, to provide the aqueous dispersion having a desired solids content. The emulsion is then cooled to a temperature of 50° C. or less, and, if needed, biocides may be added.

Some specific examples of tackifier resin/surfactant combinations that are present in the disclosed compositions and aqueous dispersions of the present invention include: (1) rosin ester tackifier resin/terpene-vinylaromatic resin-MA-PEG surfactant; (2) rosin ester tackifier resin/terpene-phenol resin-MA-PEG surfactant; (3) rosin ester tackifier resinvinylaromatic-modified hydrocarbon resin-MA-PEG; (4) terpene tackifier resin/terpene resin-MA-PEG surfactant; (5) terpene tackifier resin/hydrocarbon resin-MA-PEG surfactant; (6) terpene-vinylaromatic tackifier resin/terpene-vinylaromatic resin-MA-PEG surfactant; (7) terpene-vinylaromatic tackifier resin/vinylaromatic-modified hydrocarbon resin-MA-PEG surfactant; (8) terpene-phenol tackifier resin/terpene-phenol resin-MA-PEG surfactant; (9) hydrocarbon tackifier resin/terpene-MA-PEG, (10) hydrocarbon tackifier resin/hydrocarbon resin-MA-PEG surfactant; (11) aromatic-modified hydrocarbon tackifier resin/terpen-vinylaromatic resin-MA-PEG surfactant; (12) aromatic-modified hydrocarbon tackifier resin/vinylaromatic-modified hydrocarbon resin-MA-PEG surfactant. Each of these combinations is a separate aspect of the present invention, where "MA" indicates that maleic anhydride was reacted with the indicated resin to form the adduct, and PEG indicates that a polyethylene glycol molecule was reacted with the indicated adduct. In each of these separate aspects, the criteria as set forth above, e.g., acid number, extent of adduction as measured in weight percent, molecular weight of the PEG, etc., may be used to further characterize the products and processes of the present invention.

An exemplary aqueous dispersion that is suitable for use in waterborne adhesives may have a solids content ranging from 50–60% or from 55–60%, a pH ranging from 4–9 or 6–8; a viscosity that is less than 8000 cps or less than 1500 cps or less than 1000 cps (Brookfield #5/20 rpm or #3/50 rpm); a particle size of less than 2 $\mu$m or less than 1 $\mu$m; and a mechanical stability sufficient to pass industry screening tests related to pumping, formulating operations, and the like. Further, the aqueous dispersions of the present invention may comprise, in addition to a disclosed surfactant, a co-surfactant that may be anionic, nonionic or polymeric.

The present invention, in another aspect, is directed to an adhesive composition comprising a tackifier resin, a polymer latex, water, and at least one of: a surfactant prepared by reacting a resin with an $\alpha,\beta$-unsaturated carboxylic acid or ester or anhydride to thereby form an adduct; optionally reacting the adduct with a poly(alkyleneoxide) (PAO) to provide a surfactant; optionally treating the surfactant under sulfation or phosphorylation conditions to provide a modified surfactant The adhesive compositions may be prepared by blending an aqueous tackifier dispersion of the present invention with a natural or synthetic polymer latex or blend of latexes, according to techniques well known to those of skill in the art. Suitable polymer latexes include aqueous suspensions of natural rubber or synthetic elastomers. The latter elastomeric polymers include, but are not limited to, acrylic polymers derived from 2-ethylhexyl acrylate, butyl acrylate, methyl methacrylate, methacrylic acid, and acrylic acid; polystyrene, a styrene-butadiene copolymer; a polymer derived from a vinyl acetate such as ethylene vinyl acetate; polychloroprene; an acrylonitrile-butadiene copolymer.

In a further aspect, the present invention is directed to a pressure sensitive adhesive overlay, prepared by applying a layer of a disclosed adhesive composition to a surface of a substrate, serving as an adhesive carrier, and drying the layer. As used herein, the term "overlay" refers to any substrate having a layer of adhesive material applied to at least a portion of its surface ("first surface") and, thereby, adapted to be adhesively applied to a surface of another substrate ("second surface") by bringing the first and second surfaces into contact under pressure.

A substantial portion of the commercial production of waterborne adhesives is used for the manufacture of pressure sensitive adhesives (PSAs) for adhesive overlays such as labels, tapes, decorative appliques, and the like. Suitable substrates serving as adhesive carriers may be prepared using non-woven material such as, for example, paper, plastic, metal or foam; or may be prepared using woven material, such as, for example, woven cotton or woven synthetic polymers. Some examples of the latter are polyethylene, polypropylene, polyvinyl chloride, polyester, and polyamide.

The following examples are provided for the purpose of illustration, not limitation.

EXAMPLES

Example 1

Preparation of an Adduct by Reacting Maleic Anhydride with a Terpene-Vinylaromatic Resin A four-neck, 1L round-bottom flask was charged with 450 grams Sylvares® ZT105LT terpene-vinylaromatic resin (Arizona Chemical Company, Jacksonville, Fla.) and heated to 150° C. under 2LPM nitrogen purge. When the resin had melted and was sufficiently fluid, stirring was started at about 250 rpm. To the stirred resin was added 50.0 grams of maleic anhydride. The contents of the flask were placed under a nitrogen atmosphere, and heated to 200° C. The agitation was increased to 300 rpm. The reaction mass was stirred for 16.5 hours at 200° C., then heated to 250° C. over about 5.5 hours. A sample was analyzed showing 97.1% conversion of the maleic anhydride. The temperature was lowered to 200° C., and the contents of the flask were spared with nitrogen to remove the unreacted maleic anhydride until the acid value of a water-extract (equal weight to sample) was 0.3. The contents of the flask were discharged. Analysis of the adduct showed 6.54% maleic anhydride adducted by weight.

Example 2

Preparation of Resin Dispersion Surfactant by Reacting the Adduct of Example 1with Polyethylene Glycol A 1L, four-neck round-bottom flask equipped with a paddle stir shaft, nitrogen inlet and thermocouple was charged with 100.0 grams of the adduct from example 1 and 143.2 grams of polyethylene glycol having an average molecular weight of 2000 ("PEG 2000", Aldrich Chemical Company, Milwaukee, Wis.). The contents of the flask were heated, under 1LPM nitrogen purge. Stirring was started when the contents were molten and sufficiently fluid. When the temperature reached 219° C., 0.54 grams of 75% phosphoric acid was charged and the flask placed under a nitrogen atmosphere, and heated to 250° C. The reaction mass was stirred at this temperature for 20 hours. A sample of reaction mass had an acid number of 1.4. The contents of the flask were cooled to 157° C. and discharged.

Example 3

Dispersion of a Rosin Ester Tackifier Resin with the Surfactant of Example 2

A 1.5L resin flask was charged with 300.0 grams of Sylvares®) RE-85 (Arizona Chemical Company, Jacksonville, Fla.) and 18.0 grams of surfactant from example 2. The contents were heated under a 2LPM nitrogen sweep to 98° C. Stirring was started, and the flask was placed under a nitrogen blanket. A solution of 2.1 grams of 50% potassium hydroxide in 47 grams distilled water was prepared and heated to 80° C. When the temperature of tackifier resin-surfactant blend was 112° C., the hot potassium hydroxide solution was added to produce first a water-in-oil dispersion, which inverted to an oil-in-water dispersion. The temperature of this dispersion was brought to 97° C., and 160 grams of hot distilled water was added over 18 minutes. The resulting diluted dispersion was cooled to 59° C., and some biocide was added. After cooling further to 50° C., the dispersion was analyzed for a pH of 9.5. A sample of the dispersion was adjusted to a pH of 7.5 and 58.8% solids and a mean particle size of 0.84 microns.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A process for preparing a surfactant comprising:
    reacting an $\alpha,\beta$-unsaturated carboxylic acid or anhydride, or an ester thereof, with a resin comprising hydrocarbon monomeric residues, to provide an adduct;
    reacting the adduct with either alkylene oxide or a carboxyl-reactive poly(alkylene oxide) to provide the surfactant; and
    modifying the surfactant by either phosphorylation or sulfonation to provide a functionalized hydrophilic surfactant.

2. The process of claim 1 wherein the resin is selected from the group consisting of a polyterpene resin, a terpene-phenol resin, a terpene-hydrocarbon resin, a terpene-vinyl aromatic resin, a hydrocarbon resin, and a vinyl aromatic-modified hydrocarbon resin.

3. The process of claim 1 wherein the $\alpha,\beta$-unsaturated carboxylic acid is maleic acid, and the $\alpha,\beta$-unsaturated carboxylic anhydride is maleic anhydride.

4. The process of claim 1 wherein the resin is a polyterpene resin having a softening point of about 10° C. to about 150° C.

5. The process of claim 1 wherein the resin comprises one or more monomeric residues independently selected from the group consisting of $\alpha$-pinene, $\beta$-pinene, limonene, dipentene, $\beta$-phellandrene, $\delta$-3-carene, and $\delta$-2-carene.

6. The process of claim 5 wherein the resin further comprises one or more monomeric residues independently selected from the group consisting of isobutylene, a 1-alkene, a 2-alkene, a trisubstituted alkene, and vinylcyclohexene.

7. The process of claim 5 wherein the resin further comprises one or more monomeric residues independently selected from the group consisting of piperylene, isoprene, 2-methyl-2-bytene, 2-methyl-1-bytene, cyclopentene, an acyclic pentene, cyclopentadiene, and dicyclopentadiene.

8. The process of claim 1 wherein the resin is a terpene-phenol resin and comprises one or more monomeric residues independently selected from the group consisting of $\alpha$-pinene, $\beta$-pinene, $\delta$-3-carene and limonene.

9. The process of claim 8 wherein the terpene-phenal resin further comprises one or more monomeric residues independently selected from the group consisting of styrene, indene, $\alpha$-methylstyrene, an alkyl aromatic styrene, divinylbenzene, a divinylbenzene with one or more alkyl groups, isobutylene, dilsobutylene, a 1-alkene, a 2-alkene, a trisubstituted alkene, vinylcyclohexene, piperylene, isoprene, 2-methyl-2-bytene, 2-methyl-1-butene, cyclopentene, an acyclic pentene, cyclopentadiene, and dicyclopentadiene.

10. The process of claim 8 wherein the phenol is independently selected from the group consisting of phenol, a monosubstituted phenol, a disubstituted phenol, a trisubstituted phenol and a hydroxyl-substituted naphthalene compound.

11. The process of claim 1 wherein the resin comprises one or more monomeric residues independently selected from the group consisting of piperylene, isoprene, 2-methyl-2-bytene, 2-methyl-1-butene, cyclopentene, an acyclic pentene, cyclopentadiene, and dicyclopentadiene.

12. The process of claim 1 wherein the adduct is reacted with poly(ethylene glycol) or a mixture of more than one polyethylene glycol).

13. The process of claim 1, wherein the adduct is reacted with ethylene oxide.

14. The surfactant of claim 1.

15. A composition comprising the surfactant of claim 1 and a tackifier resin.

16. An adhesive composition comprising:
the surfactant of claim 1;
a tackifier resin;
a polymer latex; and water.

17. An aqueous dispersion comprising water and a composition comprising a surfactant and a tackifier resin, wherein the surfactant is prepared by a process comprising:
reacting an α,β-unsaturated carboxylic acid or anhydride, or an ester thereof, with a resin comprising hydrocarbon monomeric residues, to provide an adduct, and
reacting the adduct with either alkylene oxide or a carboxyl-reactive poly(alkylene oxide) to provide the surfactant.

18. The aqueous dispersion of claim 17 wherein the resin comprising hydrocarbon monomeric residues is selected from the group consisting of a polyterpene resin, a terpene-phenol resin, a terpene-hydrocarbon resin, a terpene-vinylaromatic resin, a hydrocarbon resin, and a vinyl aromatic-modified hydrocarbon resin.

19. The aqueous dispersion of claim 17 wherein the process further comprising modifying the surfactant by either phosphorylation or sulfonation to provide a functionalized surfactant.

20. The aqueous dispersion of claim 17 wherein the α,β-unsaturated carboxylic acid is maleic acid, and the α,β-unsaturated carboxylic anhydride is maleic anhydride.

21. The aqueous dispersion of claim 17 wherein the resin comprising hydrocarbon monomeric residues is a polyterpene resin having a softening point of about 10° C. to about 150° C.

22. The aqueous dispersion of claim 17 wherein the resin comprising hydrocarbon monomeric residues comprises one or more monomeric residues independently selected from the group consisting of α-pinene, β-pinene, limonene, dipentene, β-phellandrene, δ-3-carene, and δ-2-carene.

23. The aqueous dispersion of claim 22 wherein the resin comprising hydrocarbon monomeric residues further comprises one or more monomeric residues independently selected from the group consisting of isobutylene, a 1-alkene, A 2-alkene, a trisubstituted alkene, and vinylcyclohexene.

24. The aqueous dispersion of claim 22 wherein the resin comprising hydrocarbon monomeric residues further comprises one or more monomeric residues independently selected from the group consisting of piperylene, isoprene, 2-methyl-2-bytene, 2-methyl-1-butene, cyclopentene, an acyclic pentene, cyclopentadiene, and dicyclopentadiene.

25. The aqueous dispersion of claim 17 wherein the resin comprising hydrocarbon monomeric residues is a terpene-phenol resin and comprises one or more monomeric residues independently selected from the group consisting of α-pinene, β-pinene, δ-3-carene and limonene.

26. The aqueous dispersion of claim 25 wherein the terpene-phenol resin further comprises one or more monomeric residues independently selected from the group consisting of styrene, indene, α-methyl styrene, an alkyl aromatic styrene, divinylbenzene, a divinylbenzene with one or more alkyl groups, isobutylene, diisobutylene, a 1-alkene, a 2-alkene, a trisubstituted alkene, vinylcyclohexene, piperylene, isoprene, 2-methyl-2-bytene, 2-methyl-1-butene, cyclopentene, an acyclic pentene, cyclopentadlene, and dicyclopentadlene.

27. The aqueous dispersion of claim 25 wherein the phenol is independently selected from the group consisting of phenol, a monosubstituted phenol, a disubstituted phenol, a trisubstituted phenol and a hydroxyl-substituted naphthalene compound.

28. The aqueous dispersion of claim 17 wherein the resin comprising hydrocarbon monomeric residues comprises one or more monomeric residues independently selected from the group consisting of piperylenei isoprene, 2-methyl-2-bytene, 2-methyl-1-bytene, cyclopentene, an acyclic pentene, cyclopentadiene, and dicycl opentadiene.

29. The aqueous dispersion of claim 17 wherein the adduct is reacted with poly(ethylene glycol) or a mixture of more than one poly(ethylene glycol).

30. The aqueous dispersion of claim 17 wherein the adduct is reacted with ethylene oxide.

31. An adhesive composition comprising a surfactant, a tackifier resin, a polymer latex, and water, wherein the surfactant is prepared by a process comprising:
reacting an α,β-unsaturated carboxylic acid or anhydride, or an ester thereof, with a resin comprising hydrocarbon monomeric residues, to provide an adduct, and
reacting the adduct with either alkylene oxide or a carboxyl-reactive poly(alkylene oxide) to provide the surfactant.

32. The adhesive composition of claim 31 wherein the resin comprising hydrocarbon monomeric residues is selected from the group consisting of a polyterpene resin, a terpene-phenol resin, a terpene-hydrocarbon resin, a terpene-vinyl aromatic resin, a hydrocarbon resin, and a vinyl aromatic-modified hydrocarbon resin.

33. The adhesive composition of claim 31 wherein the process further comprising modifying the surfactant by either phosphorylation or sulfonation to provide a functionalized surfactant.

34. The adhesive composition of claim 31 wherein the α,β-unsaturated carboxylic acid is malaic acid, and the α,β-unsaturated carboxylic anhydride is maleic anhydride.

35. The adhesive composition of claim 31 wherein the resin comprising hydrocarbon monomeric residues is a polyterpene resin having a softening point of about 10° C. to about 150° C.

36. The adhesive composition of claim 31 wherein the resin comprising hydrocarbon monomeric residues comprises one or more monomeric residues independently selected from the group consisting of α-pinene, β-pinene, limonene, dipentene, β-phellandrene, δ-3-carene, and δ-2-carene.

37. The adhesive composition of claim 36 wherein the resin comprising hydrocarbon monomeric residues further comprises one or more monomeric residues independently selected from the group consisting of isobutylene, a 1-alkene, a 2-alkene, a trisubstituted alkene, and vinylcyclohexene.

38. The adhesive composition of claim 36 wherein the resin comprising hydrocarbon monomeric residues further comprises one or more monomeric residues independently selected from the group consisting of piperylene, isoprene, 2-methyl-2-bytene, 2-methyl-1-bytene, cyclopentene, an acyclic pentene, cyclopentadiene, and dicyclopentadiene.

39. The adhesive composition of claim 31 wherein the resin comprising hydrocarbon monomeric residues is a terpene-phenol resin and comprises one or more monomeric residues independently selected from the group consisting of α-pinene, β-pinene, δ-3-carene and limonene.

40. The adhesive composition of claim 39 wherein the terpene-phenol resin further comprises one or more monomeric residues independently selected from the group consisting of styrene, indene, α-methylstyrene, an alkyl aromatic styrene, divinylbenzene, a divinylbenzene with one or more alkyl groups, isobutylene, diisobutylene, a 1-alkene, a 2-alkene, a trisubstituted alkens, vinylcyclohexene, piperylene, isoprene, 2-methyl-2-bytene, 2-methyl-1-butene, cyclopentene, an acyclic pentene, cyclopentadiene, and dicyclopentadiene.

41. The adhesive composition of claim 39 wherein the phenol is independently selected from the group consisting of phenol, a monosubstituted phenol, a disubstituted phenol, a trisubstituted phenol and a hydroxyl-substituted naphthalene compound.

42. The adhesive composition of claim 31 wherein the resin comprising hydrocarbon monomeric residues comprises one or more monomeric residues independently selected from the group consisting of piperylene, isoprene, 2-methyl-2-bytene, 2-methyl-1-butene, cyclopentene, an acyclic pentene, cyclopentadiene, and dicyclopentadiene.

43. The adhesive composition of claim 31 wherein the adduct is reacted with poly(ethylene glycol) or a mixture of more than one poly(ethylene glycol).

44. The adhesive composition of claim 31 wherein the adduct is reacted with ethylene oxide.

45. A pressure sensitive adhesive overlay prepared by applying a layer of an adhesive composition to a surface of a substrate, and drying the layer, wherein the adhesive composition comprises a surfactant, a tackifier resin, a polymer latex, and water, wherein the surfactant is prepared by a process comprising:
reacting an α,β-unsaturated carboxylic acid or anhydride, or an ester thereof, with a resin comprising hydrocarbon monomeric residues, to provide an adduct, and
reacting the adduct with either alkylene oxide or a carboxyl-reactive poly(alkylene oxide) to provide the surfactant.

46. The pressure sensitive adhesive overlay of claim 45 wherein the resin comprising hydrocarbon monomeric residues is selected from the group consisting of a polyterpene resin, a terpene-phenol resin, a terpene-hydrocarbon resin, a terpene-vinyl aromatic resin, a hydrocarbon resin, and a vinyl aromatic-modified hydrocarbon resin.

47. The pressure sensitive adhesive overlay of claim 45 wherein the resin comprising hydrocarbon monomeric residues is selected from the group consisting of a polyterpene resin, a terpene-phenol resin, a terpene-hyrdrocarbon resin, a terpene-vinylaromatic resin, a hydrocarbon resin, and a vinyl aromatic -modified hydrocarbon resin.

48. The pressure sensitive adhesive overlay of claim 45 wherein the α,β-unsaturated carboxylic acid is maleic acid, and the α,β-unsaturated carboxylic anhydride is maleic anhydride.

49. The pressure sensitive adhesive overlay of claim 45 wherein the resin comprising hydrocarbon monomeric residues is a polyterpene resin having a softening point of about 10° C. to about 150° C.

50. The pressure sensitive adhesive overlay of claim 45 wherein the resin comprising hydrocarbon monomeric residues comprises one or more monomeric residues independently selected from the group consisting of α-pinene, β-pinene, limonene, dipentene, phellandrene, δ-3-carene, and δ-2-carene.

51. The pressure sensitive adhesive overlay of claim 50 wherein the resin comprising hydrocarbon monomeric residues further comprises one or more monomeric residues independently selected from the group consisting of isobutylene, a 1-alkene, a 2-alkene, a trisubstituted alkene, and vinylcyclohexene.

52. The pressure sensitive adhesive overlay of claim 50 wherein the resin comprising hydrocarbon monomeric residues further comprises one or more monomeric residues independently selected from the group consisting of piperylene, isoprene, 2-methyl-2-bytene, 2-methyl-1-butene, cyclopentene, an acyclic pentene, cyclopentadiene, and dicyclopentadiene.

53. The pressure sensitive adhesive overlay of claim 45 wherein the resin comprising hydrocarbon monomeric residues is a terpene-phenol resin and comprises one or more monomeric residues independently selected from the group consisting of α-pinene, β-pinene, δ-3-carene and limonene.

54. The pressure sensitive adhesive overlay of claim 53 wherein the terpene-phenol resin further comprises one or more monomeric residues independently selected from the group consisting of styrene, indens, a-metthylstyrene, an alkyl aromatic styrene, divinylbenzene, a divinylbenzene with one or more alkyl groups, isobutylene, diisobutylene, a 1-alkene, a 2-alkene, a trisubstituted alkene, vinylcyclohexene, piperylene, isoprene, 2-methyl-2-butene, 2-methyl-1-bytene, cyclopertene, an acyclic pentene, eyclopentadiene, and dicyclopentadiene.

55. The pressure sensitive adhesive overlay of claim 53 wherein the phenol is independently selected from the group consisting of phenol, a monosubstituted phenol, a disubstituted phenol, a trisubstituted phenol, and a hydroxyl-substituted naphthalene compound.

56. The pressure sensitive adhesive overlay of claim 45 wherein the resin comprising hydrocarbon monomeric residues comprises one or more monomeric residues independently selected from the-group consisting of piperylene, isoprene, 2-methyl-2-bytene, 2-methyl-1-butene, cyclopentene, an acyclic pentene, cyclopentadiene, and dicyclopentadiene.

57. The pressure sensitive adhesive overlay of claim 45 wherein the adduct is reacted with poly(ethylene glycol) or a mixture of more than one poly(ethylene glycol).

58. The pressure sensitive adhesive overlay of claim 45 therein the adduct is reacted with ethylene oxide.

* * * * *